Dec. 11, 1962    E. LETHBRIDGE    3,067,828
LOAD INDICATING MECHANISM
Filed Sept. 8, 1959    2 Sheets-Sheet 1

Inventor
ERNEST LETHBRIDGE
By Strauch, Nolan & Neale
Attorneys

Dec. 11, 1962     E. LETHBRIDGE     3,067,828
LOAD INDICATING MECHANISM
Filed Sept. 8, 1959     2 Sheets-Sheet 2
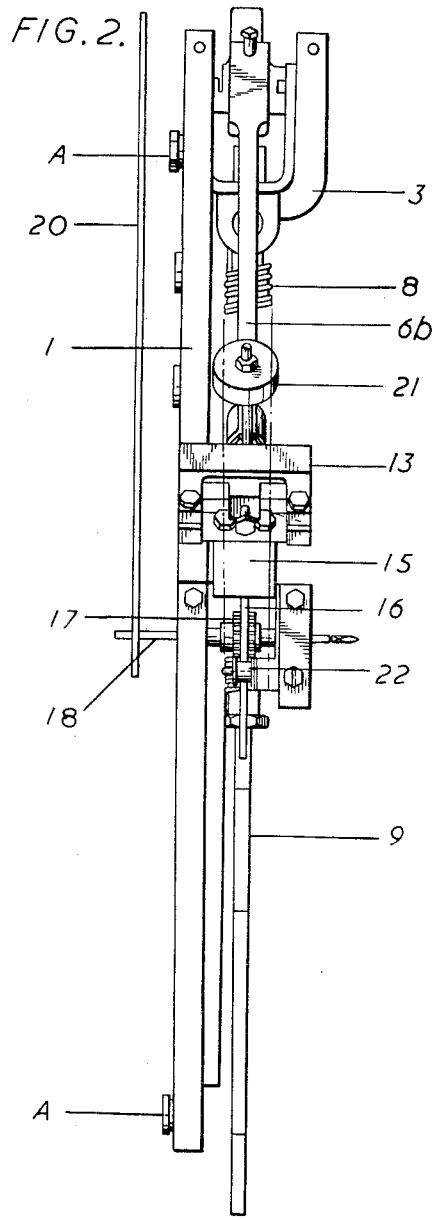
Inventor
ERNEST LETHBRIDGE
By Strauch, Nolan +
Neale
Attorneys

United States Patent Office 3,067,828
Patented Dec. 11, 1962

3,067,828
LOAD INDICATING MECHANISM
Ernest Lethbridge, Birmingham, England, assignor to W. & T. Avery Limited, Birmingham, England, a company of Great Britain
Filed Sept. 8, 1959, Ser. No. 838,766
4 Claims. (Cl. 177—173)

This invention has reference to improvements in or connected with load indicating mechanism for incorporation in for example weighing apparatus or physical testing machines.

The present invention has for its object to provide indicating mechanism of particularly compact and simple construction.

The invention consists of a load indicating mechanism comprising a supporting frame, a cranked lever having a substantially horizontal limb pivotally mounted on the frame and a downwardly directed limb, means for coupling load responsive apparatus to the lever adjacent to the lever fulcrum, a rack pivotally mounted on the downwardly directed lever limb, a pinion meshing with the rack, a rotatably mounted indicator spindle having the pinion and indicative means fastened thereto, and a spring resistant coupled to the horizontal lever limb.

The invention further resides in the anchorage of the end of the aforesaid spring resistant remote from the lever on a manually displaceable support whereby the spring resistant may be tensioned to tare or zero the indicating mechanism.

Preferred means for carrying the invention into practice will now be described with reference to the accompanying drawing, wherein:—

FIGURE 2 is an end elevation in the direction $x$ in FIGURE 1.

Figure 1:
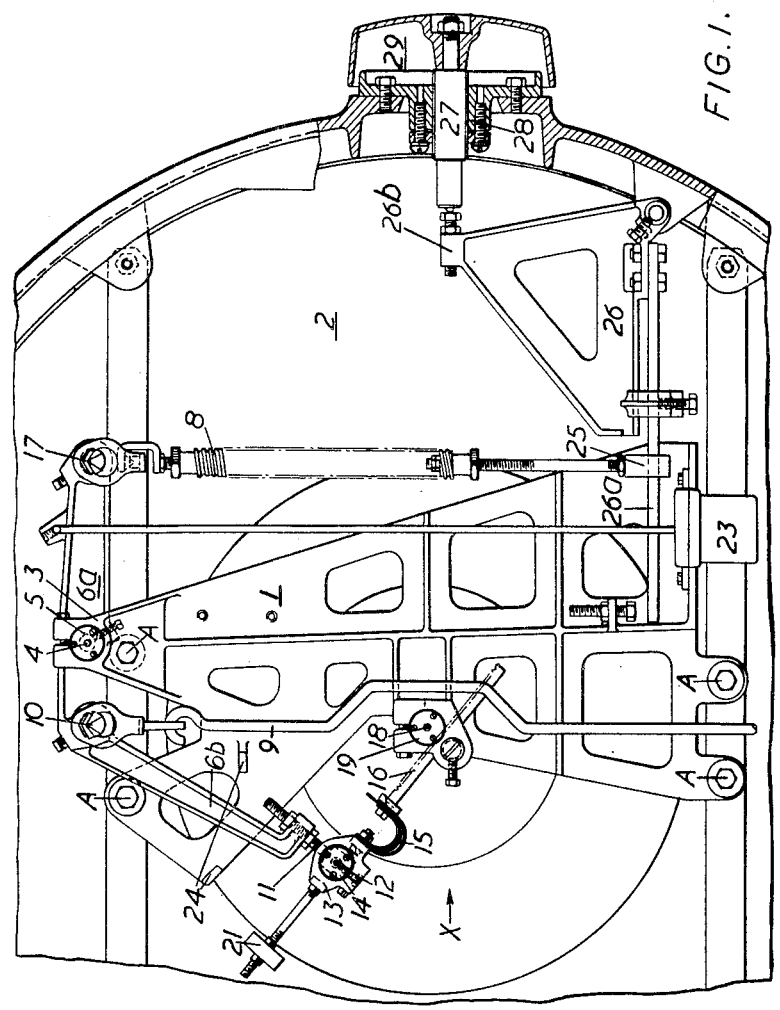
FIGURE 1 is a part sectional side elevation of a load indicating mechanism according to the invention.

As seen in the drawing the indicating mechanism comprises a frame 1 which is bolted at A to fixed members of the indicator housing 2 of say weighting apparatus or a physical testing machine. The upper end of the frame has an integral bifurcated bracket 3 for the support of a fulcrum spindle 4 mounted in a ball or roller anti-friction bearing 5 fitted one in each jaw of the bracket 3. The aforesaid fulcrum spindle carries the horizontal limb $6^a$ of a lever of cranked formation generally designated 6 comprising the normally horizontal limb and an integral second limb $6^b$ extending downwardly at an angle of about 120 degrees relative to the horizontal limb $6^a$. The free end of the horizontal limb $6^a$ is coupled through a knife-edge bearing and shackle 7 to the upper end of a tension spring 8 the lower end whereof is anchored as hereinafter described.

At the end of the lever 6 adjacent to its fulcrum 4 a dependent connecting rod 9 is coupled to the lever through a knife-edge bearing and shackle 10 and this connecting rod is adapted at its lower end in known manner for attachment to a load responsive part (not shown) of the weighing or testing apparatus.

On the free end of the downwardly extending limb $6^b$ of the lever is mounted a screw threaded pin 11 extending and adjustable in the general direction of the limb $6^b$ and carrying at its outer end a cross pin 12 on which a housing 13 is rotatably mounted by means of a pair of anti-friction ball or roller bearings 14 whereby the housing 13 is permitted angular movement in a vertical plane. The housing 13 is connected through a C-shaped leaf spring 15 to one end of a rack 16 having meshing engagement with a pinion 17 secured to an indicator spindle 18 which is rotatably mounted in ball or roller anti-friction bearings 19 on the frame 1 vertically below the knife edge bearing at 10 and carries a pointer 20 registering with a fixed chart (not shown). The housing 13 is also furnished with an adjustable counterbalancing weight 21, and the rack 16 is maintained in engagement with the pinion 16 by a supporting roller 22.

The lever 6 has connection with a dashpot 23 for damping oscillations of the lever and lugs 24 are provided on the frame 1 for limiting the movement of the lever 6.

In operation the movement of the connecting rod 9 arising from a load applied to the rod 9 results in a magnified angular movement of the free end of the downwardly directed limb $6^b$ of the lever 6 until the load is counterbalanced by the tension in the spring resistant 8. This movement of the lever is transmitted through the rack 16 and pinion 17 and to the pointer 20, and since the movement of the weighing or testing apparatus has already been magnified by reason of the relative distances between the fulcrum 4 and the bearing 10 and between the fulcrum 4 and the rack fulcrum 12, the pointer can be driven through a relatively large diameter pinion 17 with consequent better accuracy than that which would obtain if the magnification of the pointer movement was derived by the use of a small pinion. Further, by reason of the downward inclination of the lever limb $6^b$ the mechanism is of compact construction.

In the aforesaid mechanism means for taring or zeroing the indicator may be conveniently furnished (see FIGURE 1) by anchoring the lower end of the tension spring 8 by a shackle 25 on one limb $26^a$ of a bell crank lever 26 the opposite end $26^b$ whereof bears, by reason of the tension in the spring 8, against one end of a manually rotatable spindle 27 having screw threaded engagement with a part 28 of the housing 2. By this means the tension which obtains in the spring 8 may be varied by rotation of the knob 29 fixed to the spindle 27 to rock the bell crank lever 26. In an alternative embodiment (not shown) the anchorage of the tension spring 8 may be displaced through the agency of a cam mounted on the manually rotatable spindle 27 instead of through the aforesaid bell crank lever.

I claim:

1. Load indicating mechanism comprising a support, a lever having a horizontal arm intermediately fulcrummed on said support and a downwardly directed arm rigid with one end of said horizontal arm and extending at an obtuse angle relative thereto, load applying means connected to said lever at the juncture between said horizontal and downwardly directed arms, spring means connected to said lever on the other side of said fulcrum for counterbalancing said load, a rotatably mounted indicator spindle on said support, and means interconnecting said one side of said lever to rotate said spindle in response to pivotal displacement of the lever caused by application of load to said load applying means comprising a composite member having a first part pivoted to the end of said downwardly directed arm, a second part connected to said spindle of such construction as to translate essentially linear movement of said member to rotation of the spindle, and a resilient portion interconnecting said parts.

2. Load indicating mechanism comprising a supporting frame, a cranked lever fulcrummed on said frame, said lever having a substantially horizontal limb and a downwardly inclined limb and being fulcrummed about a point on said horizontal limb, a connecting rod coupled to the lever substantially at the juncture of said limbs of the lever adjacent the lever fulcrum for imparting to the lever a measure of the load to be indicated, a housing pivoted on the downwardly inclined limb of said lever at a distance greater than the distance between the coupling of the connecting rod to the lever and the lever fulcrum, a rack, spring means connecting said rack to said housing, means for adjusting said housing in the direction of said limb on which it is pivoted, an adjustable counterweight on said housing, an indicator spindle rotatably mounted on said frame and having a drive pinion, means maintaining said rack in mesh with said pinion, and a counterbalance spring connected to said horizontal limb of said lever.

3. Load indicating mechanism comprising a support, a generally horizontal lever fulcrummed intermediate its ends on a horizontal axis on said support, means applying a downwardly directed load to said lever at one side of the fulcrum, spring means secured to said lever at the other side of said fulcrum to oppose pivotal movement of the lever by said load applying means, a rotatable indicator spindle carrying a pinion mounted on said support on a horizontal axis parallel to said fulcrum below said horizontal lever, means providing a rigid extension of said lever, said extension projecting angularly downwardly from the connection of the load applying means to said one side of said lever, and a rack assembly pivotally mounted on the end of said lever extension and extending angularly relative to said lever extension toward said spindle, said rack assembly comprising a resiliently mounted rack meshed with said pinion on the spindle.

4. The load indicating mechanism defined in claim 3 wherein said means applying a load to the lever comprises a knife edge and bearing assembly at the lever, and said spindle is located vertically below said knife edge and bearing assembly.

References Cited in the file of this patent

UNITED STATES PATENTS

| | | |
|---|---|---|
| 205,850 | Fredericks | July 9, 1878 |
| 458,322 | Stuart | Aug. 25, 1891 |
| 821,221 | Cochran et al. | May 22, 1906 |
| 1,249,927 | Dunn | Dec. 11, 1917 |
| 1,253,239 | Hapgood | Jan. 15, 1918 |
| 1,806,741 | Cameron | May 26, 1931 |
| 1,900,964 | Weber | Mar. 14, 1933 |
| 2,659,594 | Eisner | Nov. 17, 1953 |